Jan. 7, 1947.    R. H. RUSHMER    2,413,729
BONDED ABRASIVE AND METHOD OF MAKING SAME
Filed March 7, 1944
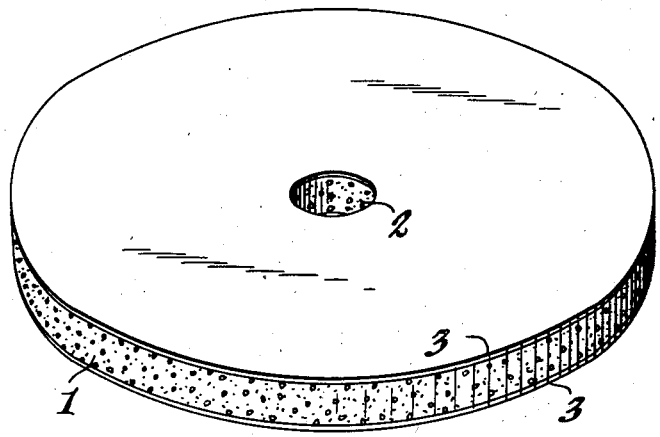
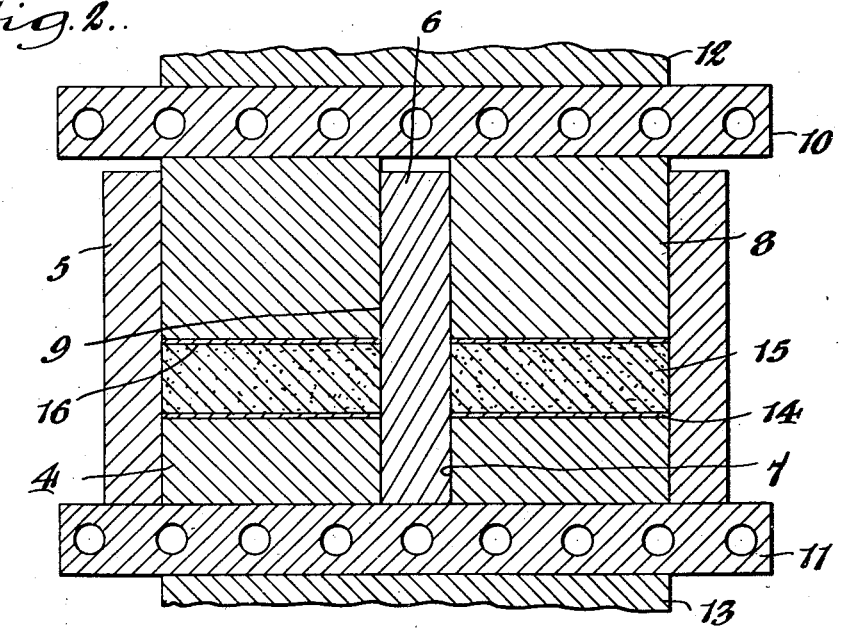
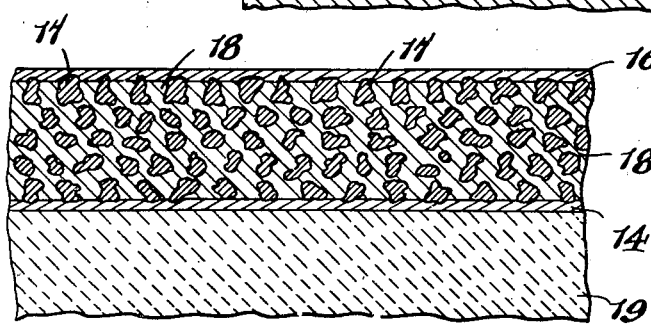
Inventor
RALPH H. RUSHMER
by W. Foley
Attorney Patented Jan. 7, 1947

2,413,729

UNITED STATES PATENT OFFICE 2,413,729

BONDED ABRASIVE AND METHOD OF MAKING SAME

Ralph H. Rushmer, Niagara Falls, N. Y., assignor to The Carborundum Company, Niagara Falls, N. Y., a corporation of Delaware Application March 7, 1944, Serial No. 525,379

11 Claims. (Cl. 51—298)

This invention relates to resinoid bonded abrasive articles and to methods of making them. More particularly, the invention relates to an improved method of molding and curing resinoid bonded abrasive articles and to the article resulting therefrom.

Among the objects of this invention is the provision of a method of molding and curing resinoid bonded abrasive articles whereby such cured articles are usable in their entirety and need not be further finished to size. Another object of this invention is the provision of a method which eliminates sticking of the molded article to its support during curing. A still further object is the production of a molded resinoid bonded abrasive article having distinctive surface characteristics. A further object is the production of an improved resinoid bonded abrasive article having uniform characteristics throughout and accurately and economically molded to final thickness. These and further objects of the invention will appear as the description proceeds.

In making resinoid bonded abrasive articles, such as for instance wheels, in accordance with prior art methods, a suitable mixture of abrasive grit and resinoid bond is put into a mold of the desired shape, pressed to a suitable density, and then cured either by heating in the mold or by taking the pressed article from the mold, putting it on a batt, surrounding it with inert granular material to prevent slumping, and curing the pressed article in an oven by heating it for a relatively long time in accordance with a predetermined cycle of curing. The curing of the pressed article in the mold is not economical since for quantity production this requires a large number of relatively expensive molds and so the usual procedure is to cure such articles on batts. In either prior art curing method, however, there are inherent difficulties which, until the present invention, have been accepted as inevitable by the industry. If the pressed article is cured in the mold, it tends to stick to the top and bottom plungers thereof, at least in portions, so that upon withdrawal of the cured article from the mold portions are torn from the faces of the article. If the article is cured by removing it from the mold and heating while on a batt, it also sticks to the batt and upon removal therefrom at the end of the cure tends to tear portions from the batt. Such material from the batt must be removed from the molded article by facing the same. The tendency of the pressed article to stick to either the mold or the batt appears to be aggravated by the tendency of the resin during the curing to flow to a certain extent to the outer faces of the article.

In addition to the defacing of the article caused by the aforementioned sticking to the support during cure, the articles produced by prior art methods which are molded to final thickness are non-uniform in character. The outer portions of the cured articles, more particularly the broad faces, have such different structure from that in the interior of the article that if a wheel so made is used in a snagging operation in its cured condition without being faced, a spalling or shucking-off of the outer layer on the faces, more particularly at the corners, occurs in a relatively short time. Such spalling in a wheel 1½ inches thick may, for example, extend inwardly to a depth of ⅛" from each face.

The reasons for this phenomenon are not fully known. It has been theorized that, since the cure takes place in an oven which, although closed, is not sealed, and had air in it at the start of the cure, oxidation of the resin bond takes place on the exposed surfaces of the article. According to this theory the oxidized resin lacks the strength of the resin in the interior of the article and it soon becomes weakened and broken under operating conditions. Another theory is that since a relatively large amount of resin solvent, which may be, for instance, furfural, is given off by the articles during cure and the atmosphere in the oven contains a relatively large amount of such solvent, the resin on the exposed portions of the article, being constantly subjected to such solvent atmosphere, is of a different type from that in the interior of the article and possesses different properties, such as a different coefficient of expansion. The adherents of this theory believe that upon heating of a resin bonded abrasive article so produced, due to its use in a severe grinding operation, the difference in coefficients of expansion between the inner and outer portions of the article causes a breakage to occur in the boundary between such portions, which is a plane more or less parallel to the surface, thus resulting in the observed spalling.

Under a relatively low power microscope the surface of a resin bonded abrasive article resulting from a prior art cure on a batt in an oven shows numerous small shallow dark patches in the resin where such resin communicates with the surface, whereas the cured resin in the interior of the article is a greenish gray in color. This clearly shows that the resin on the exterior of such article is of a different character from that in the interior, but whether it is due to oxidation of the resin or the formation of a different resin due to the effect of the solvent is not known.

The present invention overcomes the two difficulties, set out above, which are inherent in the prior art method of making resin bonded abrasive articles, namely, their sticking to the support, and the formation of a structure on the exterior different from that of the interior. By practice of the present invention the molded article does not adhere to its support during curing and the article may be accurately molded to size without the necessity of finishing or facing steps. At the same time, practice of the invention results in the production of an article possessing a distinctive finish on one or more faces thereof.

The invention will be more readily understood by reference to the accompanying drawing in which Figure 1 is a perspective view of a grinding wheel made in accordance with one modification of the invention, Figure 2 is a view in cross-section of a typical mold employed in the manufacture of a wheel in accordance with the invention, and Figure 3 is an enlarged schematic view in cross-section of the molded resin bonded abrasive article on a support such as a batt.

The resin bonded abrasive wheel shown in Figure 1, which in this instance is a conventional peripheral grinding wheel such as a snagging wheel, consists of a body 1 of disc shape having a centrally located arbor hole 2. The side faces of the wheel are covered more or less continuously with thin layers 3 of material initially thermoplastic and at least partially decomposable at the temperature of cure. Such material was applied to the faces of the wheel either before or after the molding thereof, but before the curing of the resinoid bond. As a consequence of the heating to which layers 3 have been subjected during curing of the wheel to which they are affixed, they are, to a greater or less degree, depending upon their initial character and composition, charred or decomposed.

The wheel shown in Figure 1 may be made, for example, in the following manner. A suitable mixture of abrasive grain and resin bond may be prepared in accordance with Martin Re. Patent No. 19,318. Such mixture is then molded to shape in a mold such as that shown in Figure 2, which consists of a bottom plunger 4 fitting within a mold barrel 5, and having a centrally located core or arbor pin 6 located in a central hole 7 in bottom plunger 4. The mold is completed by a top plunger 8, which fits within the mold barrel and is provided with a central hole 9 for the reception of arbor pin 6. When such mold is employed for hot pressing, it is mounted between top and bottom hot plates 10 and 11, respectively, which, in the modification shown, are heated by steam, and the whole assembly placed between the top plunger 12 and the platen 13 of a press.

In accordance with the present invention a thin layer of a thermoplastic, at least partially heat decomposable, material 14, cut accurately to the shape of the face of the article to be molded, is placed within the mold on top of plunger 4. The mixture of abrasive grain and resin bond previously mentioned is then charged into the mold and accurately distributed to as uniform a depth as possible. There is then placed on top of such mixture 15 a further thin layer of thermoplastic, at least partially heat decomposable, material 16. It should be understood that the thicknesses of layers 15 and 16 in Figure 2 are greatly exaggerated in order to aid in comprehension of the invention. After the placement of layer 16 on the mixture 15, top plunger 8 is placed in the mold barrel and the mold with top and bottom hot plates is placed in the press where it is heated by the hot plates and the mixture of grain and bond molded and compacted to shape by compressing it at a moderate pressure as, for instance, 2000 pounds per square inch. It is to be understood, however, that the pressing may take place in the cold if desired; no substantial difference is observable in the finished cured article whether the pressing is done hot or cold. As a result of the pressure applied during molding of the article, layers 14 and 16 become firmly and intimately attached to the faces of the molded article. If the molding is done hot, such attachment appears to be improved. The heating allows deeper penetration of the coatings by the outer grains of the molded article and encourages some adhesion between the layers and the as yet uncured resin bond. Whether the molded article is pressed hot or cold, however, heating of it during curing causes the resin bond to soften and adhere to the protective coating or coatings.

Following molding of the article, it is, in this modification of the procedure, removed from the mold, placed on a batt or other suitable support, and is ready for curing. In Figure 3 the molded article is shown schematically in cross-section, with parts greatly enlarged, on a batt 19, likewise shown in cross-section. In Figure 3, layers 14 and 16, shown greatly enlarged, are penetrated to a certain extent by the outer layers of grains 17 of the molded article. In addition, since the molding in this instance was performed while the abrasive-bond mixture was hot, flow of the resin bond 18 was encouraged so that in the outer faces of the article it lies in fairly intimate contact with layers 14 and 16. The article thus supported on a batt is placed within a curing oven, surrounded with inert granular material to prevent slumping of the article, and subjected to temperatures which rise gradually to a maximum in the order of 350°–400° F. where it is held for a predetermined time, following which it is slowly cooled to room temperature. Upon completion of the cure it is found that the molded article with its protecting layers on the faces thereof may be easily removed from the support or batt, and that all tendency of the cured article to stick to the batt is overcome. In instances where the protecting layers 14 and 16 are of such character that they have low temperatures of decomposition, the layers are found to have been charred to such extent that they may easily be removed as by brushing operation. However, their presence on the wheel does not affect its properties adversely, and they are usually left thereon. Where the material of which layers 14 and 16 are composed has a relatively high temperature of decomposition, one which is appreciably higher than that at which the curing of the article is carried out, the protecting layers on the finished cured article maintain their identity to a substantial extent and retain an appreciable strength. Such layers form a desirable distinctive glazed finish on the faces of the article, and, since they do not detrimentally affect its grinding operation, they are usually left on it.

For purposes of illustration of the method the following example is given of the method of making a wheel suitable for snagging operations. A mixture of abrasive grit and bond resin, having the following ingredients in the proportions by weight indicated, is made up in the conventional manner:

| | Parts |
|---|---|
| 12 grit Al₂O₃ | 80 |
| Liquid Bakelite resin BR 1372 | 3 |
| Solid Bakelite resin BR 2417 | 7 |
| Flint | 10 |

Bakelite resin BR 1372 is an unmodified condensation product of the reaction between phenol and an aldehyde. Bakelite resin BR 2417 is likewise an unmodified condensation product of the reaction between phenol and an aldehyde, but is advanced to a solid state by heating.

Such abrasive resin mixture is charged into a mold such as that shown in Figure 2. Protecting layers 14 and 16 in this instance consist of films of ethyl cellulose approximately .001" thick. After being molded to shape, the wheel is heated in an oven which is raised from 70° to 375° F. In a period of 24 hours, is held at 375° F. for 10 hours, and is then cooled to room temperature at a rate of approximately 20° F. per hour. It is obvious that other synthetic resin bonds may be employed in the practice of this invention if desired, such resins being such that they soften somewhat upon initiation of the curing treatment. If other resins are used the curing cycle chosen for the molded article is one which is appropriate to the resin.

The ethyl cellulose film employed in this example is one known as "Ethofoil No. 10," a product of the Dow Chemical Company. This material, which has a softening temperature of 270° F. and a melting temperature of 330° F., has proved to be ideal in carrying out the method of the present invention. Upon completion of the cure of the abrasive article the ethyl cellulose film is found to be blackened and charred so that it can be easily removed, indicating that it has almost been completely decomposed.

In place of ethyl cellulose films other films or layers of thermoplastic materials which soften at temperatures well below the maximum temperature of the cure may be used. Preferably, such layers or films decompose at least partially under the curing conditions employed. Cellulose derivatives, that is, cellulose esters or cellulose ethers, have been found to be ideal for this purpose. One material of this character, other than the ethyl cellulose already mentioned, is cellulose acetate. This material, which melts at from 455°–555° F., depending upon the degree of acetylation, but which is thermoplastic at much lower temperatures, remains on the cured article as a more or less continuous layer although some darkening of the layer is observed, showing that some decomposition of such layer has occurred. Cellulose acetate containing from between 50–58% acetic acid and having a melting point from 455°–518° F. may be employed. It has been found that the cellulose acetate designated as type F, made by the Hercules Powder Company, which contains from 55–57% acetic acid is eminently satisfactory. Such material may be used in any of the three viscosities in which it is made, namely, low, below 20 seconds, medium, 20 seconds to 60 seconds, and high, over 60 seconds.

Another cellulose derivative which may be used in the present invention is cellulose nitrate. This may be applied as a film in the same manner as in the case of the two materials mentioned above.

Among other materials suitable for the protecting layers or films on molded resinoid bonded articles are polystyrene, cellulose acetyl butyrate, polyvinyl alcohol, polyvinyl chloride, polyvinyl butyral, polyvinyl chloro-acetate, vinylidene chloride, methyl methacrylate, and acrylic copolymers.

Although the application of films or thin layers of such protecting materials has been disclosed as being accomplished by cutting out suitably sized pieces from preformed sheets or films of such material and applying them to the article, it is obvious that such thin layers may be applied, where feasible, by painting or spraying such material in a suitable vehicle onto the molded article or onto the mold part or support with which it comes in contact. Thus, protecting layer 14 might be applied to mold part 4 by spraying such material in a vehicle onto the mold part, which has been suitably coated with a parting layer such as an oil, to a suitable thickness, and protective layer 16 might be applied to mold part 8, similarly previously coated with a parting material, by a similar process. Upon compression of the abrasive-resin mixture in the mold between parts 4 and 8, protecting layers 14 and 16 become attached to the molded article and upon stripping of the molded article from the mold such layers remain on the article. The article may be molded either hot or cold in the conventional manner and the protecting layers applied later either as preformed films as already indicated, or such layers may be applied to the molded article by means of painting or spraying the article with the materials above dissolved or dispersed in a suitable vehicle.

Although in order to attain uniform structure throughout the molded article it is preferred that protecting layers be placed on both such faces, one of the advantages of the present invention, namely the prevention of sticking of the molded article to the support during curing, may be accomplished by use of only one protecting layer which is interposed between the molded article and the support upon which it rests during curing. The protecting layers employed may range in thickness from one which is handleable with reasonable care, in the order of .00088" to one of appreciable thickness, such as .01" or over.

The method of the present invention finds particular advantage, insofar as preventing sticking to the support during curing is concerned, in the coarse grit sizes such as those used in snagging wheels. Such grit sizes may be said to be roughly those including and lying between 12 and 36 grit. In all resin bonded articles molded to finished thickness and cured by prior art methods, however, a difference in structure between the inner and outer parts has been apparent. The present invention produces cured resin bonded abrasive article which are uniform throughout, when coatings of the type disclosed are used on both broad faces of the article. It is to be understood, therefore, that the present invention is not limited to the employment of coarse grits and that it displays advantages both in producing articles of uniform structure and preventing sticking of the molded articles to the supports on which they are cured regardless of the particular size or sizes of grit employed.

While preferred examples of the method of molding and curing resinoid bonded granular articles and the product resulting therefrom have been described above in detail, it is to be understood that the invention is not limited to

I claim:

1. The method of making resin bonded abrasive articles of substantial thickness having the resin bond uniformly cured throughout comprising molding the article directly to the desired thickness from a mix comprising abrasive grain and a resin bond therefor which softens during the heat treatment of the article, incorporating on each of the side faces of the article prior to the curing of the resin bond a thin layer of the order of not more than about a hundredth of an inch thickness of a synthetic plastic material of permanently thermoplastic character to protect the bond of the article from external influences such as oxidation during the heat treatment thereof and to provide final side surfaces for the finished article, heat treating the formed article while thus protected to mature the resin bond uniformly from one side throughout the article to the opposite side and adhere the plastic material to the surface of the article in the form of substantially continuous films as a protection thereto while said article is supported on a rigid member with one of the layers of plastic material positioned between the formed article and the supporting member, and removing said abrasive article from said supporting member.

2. The method of making resin bonded abrasive articles of substantial thickness having the resin bond uniformly cured throughout comprising molding the article directly to the desired thickness from a mix comprising abrasive grain and a resin bond therefor which softens during the heat treatment of the article, incorporating on each of the side faces of the article prior to the curing of the resin bond a thin layer of the order of not more than about a hundredth of an inch thickness of a synthetic plastic material of thermoplastic character selected from the group consisting of cellulose esters and ethers and permanently thermoplastic synthetic resins to protect the bond of the article from external influences such as oxidation during the heat treatment thereof and to provide final side surfaces for the finished article, heat treating the formed article while thus protected to mature the resin bond uniformly from one side throughout the article to the opposite side and adhere the plastic material to the surfaces of the article in the form of substantially continuous films as a protection thereto while said article is supported on a rigid member with one of the layers of plastic material positioned between the formed article and the supporting member, and removing said abrasive article from said supporting member.

3. A resin bonded abrasive article comprising a mass of abrasive grains bonded with a heat hardened resin, said resin bond structure and composition being the same on the exterior side faces of the article as the resin bond structure and composition of the interior of the article, the said side faces of said article constituting the originally molded faces of the article, said article having the side faces protected by a substantially continuous, thin film in the order of not more than about a hundredth of an inch thickness of an initially thermoplastic, synthetic plastic material in at least partially decomposed or charred condition and conforming to the contour of the abrasive grains constituting said faces of the article.

4. The method set out in claim 1 in which said thermoplastic material is cellulose acetate.

5. The method set out in claim 1 in which said thermoplastic material is ethyl cellulose.

6. The method set out in claim 1 in which said thermoplastic material is cellulose nitrate.

7. The method as set forth in claim 1 in which said thermoplastic material is a cellulose derivative.

8. A resin bonded article as set out in claim 3 in which said initially thermoplastic material is heat treated and at least partially decomposed cellulose acetate.

9. A resin bonded article as set out in claim 3 in which said initially thermoplastic material is heat treated and at least partially decomposed ethyl cellulose.

10. A resin bonded article as set out in claim 3 in which said initially thermoplastic material is heat treated and at least partially decomposed cellulose nitrate.

11. A resin bonded article as set out in claim 3 in which said initially thermoplastic material is heat treated and at least partially decomposed cellulose derivative.

RALPH H. RUSHMER.